3,340,773
BI-VALVE
Rudolph J. Franz, Arlington Heights, Ill., assignor to The Dole Valve Company, Morton Grove, Ill., a corporation of Illinois
Filed July 28, 1965, Ser. No. 475,358
5 Claims. (Cl. 91—465)

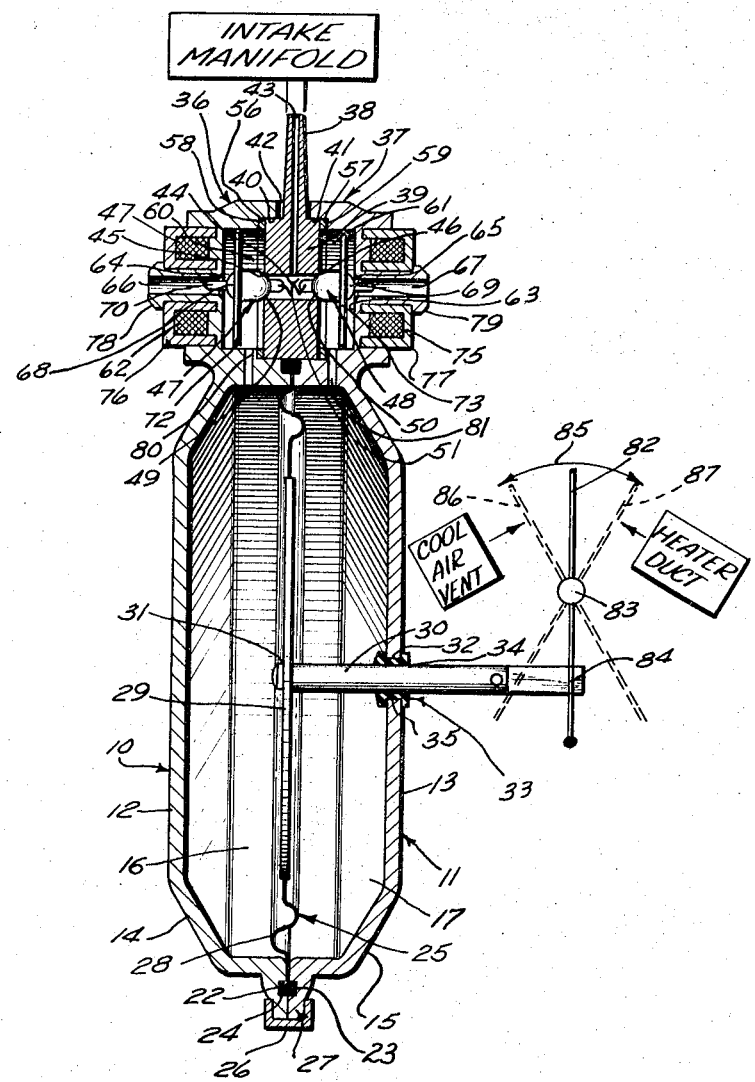

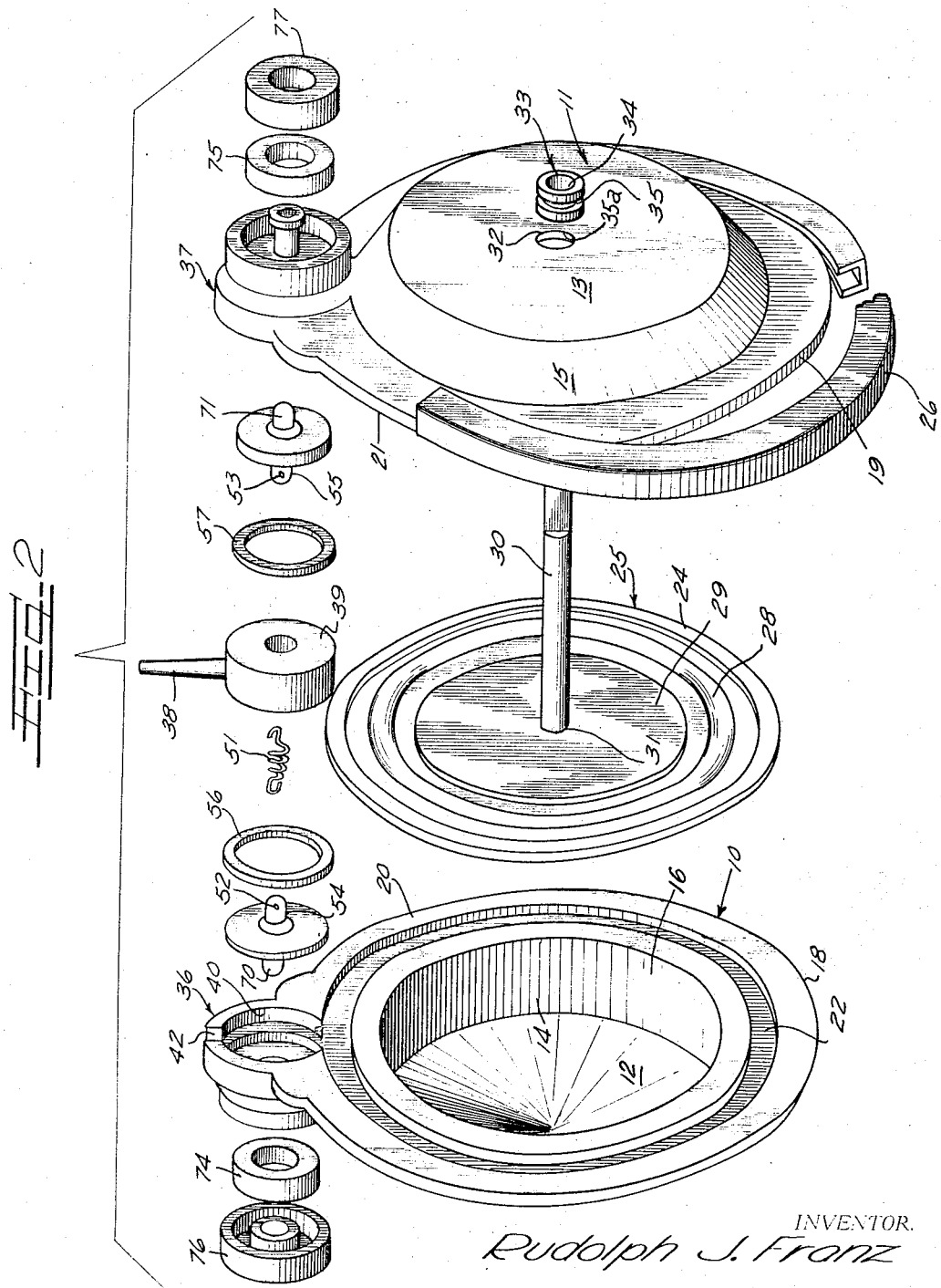

ABSTRACT OF THE DISCLOSURE

A tri-position pressure differential valve having a valve section and an actuator section wherein the valve section has first and second independently operable valve means for opening and closing the communication of a vacuum source to one of two actuator chambers of the actuator section. Either one of the two independently operable valves may be opened for a short duration of time to allow a power diaphragm which divides the actuator section into the respective actuator chambers to move to any one of an infinite number of stationary positions. The diaphragm moves by applying vacuum to one side of the diaphragm and atmosphere to the other side, and the movement of the diaphragm may be stopped by closing off the vacuum supply to the low pressure side of the diaphragm and immediately venting the low pressure side to the atmosphere to re-equalize pressures across the diaphragm.

---

This invention relates to a tri-position vacuum valve for operating a power actuator.

It is an object of this invention to provide a valve actuating unit which has a tri-position operating state.

It is another object of this invention to provide a valve actuating unit having a pair of oppositely disposed valve heads joined by a common biasing member.

FIGURE 1 shows a cross-sectional view of a valve actuator according to this invention.

FIGURE 2 is an exploded view of the valve actuator unit of FIGURE 1 for illustrating the configuration and the cooperation of the individual elements.

The valve and actuator housings of this device are formed integrally and comprise first and second wafer-like sections 10 and 11 which when assembled as in FIGURE 1 form a completed casing. The sections 10 and 11 are provided with principal walls 12 and 13 and partially tapered end faces 14 and 15 to define hollow regions 16 and 17. The regions 16 and 17 become the vacuum chambers of the system when the wafer-like sections 10 and 11 are assembled as in FIGURE 1.

Assembly of the wafer-like sections occurs at a pair of flanges extending radially from the partially tapered end walls 14 and 15. Flanges 18 and 19 are provided with plane faces 20 and 21 having rectangular grooves 22 and 23 for receiving a complementarily formed bead 24 of a power diaphragm 25. The wafer-like sections together with the diaphragm 25 are then maintained in position by a C-clamp 26 which is snapped into position about a rim 27 formed by the junction of the flanges 18 and 19.

When assembled in the above manner, the power diaphragm 25 provides a common wall between the two substantially similar vacuum chambers 16 and 17. Through this construction bi-directional translational motion of the diaphragm can be achieved by evacuating or partially evacuating either of these vacuum chambers.

The diaphragm itself consists of the bead 24, which is both a seal for the flanges 18 and 19 and a principal support for the diaphragm, a web portion 28, which is sufficiently flexible to allow an unrestrained translation of the diaphragm, and a central stiffener plate 29 which provides sufficient rigidity to the diaphragm assembly to support a power member.

The power member of this system comprises an actuator shaft 30 which is suitably mounted centrally of the stiffener plate 29 as at 31 and which is received through an actuator opening 32 also formed centrally at the annular wall 13 of the wafer-like section 11. The actuator shaft 30 rides within a resilient seal 33 which is snap-fitted within the actuator opening 32. The seal 33 forms an air-tight pressure seal at a central opening 34 and forms a like seal at a rectangular groove 35 fitted against the wall 35a of the actuator opening 32. Through the provision for the pressure seal 33, then, the actuator shaft 30 is allowed to extend through the annular wall 13 in response to the bi-directional translation of the power diaphragm 25.

The valve assembly which controls the degree of vacuum delivered to the chambers 16 and 17 is considerably smaller than the corresponding actuator sections and is entirely housed within semi-casings 36 and 37 formed integrally with each of the wafer-like sections 10 and 11. Essentially, the valve assembly comprises a means for connecting a vacuum supply to each of the vacuum chambers 16 and 17. Depending upon whether the chamber 16 or the chamber 17 is evacuated, the actuator shaft 30 will then respond accordingly.

Means for making a connection with the intake manifold is provided in the form of an elongated tapered nipple 38 formed integrally with a partition disk 39. The disk 39 is then fitted internally of the semi-casings 36 and 37 at radially extending shoulders 40 and 41. The nipple portion 38 is permitted to extend through an opening 42 formed at the junction of the respective semi-casings 36 and 37.

The nipple 38 extends sufficiently above the semi-casings 36 and 37 for receiving a hose or similar conduit having a direct connection to the manifold vacuum supply. Vacuum is received within the nipple 38 at a needle-like passageway 43 which conducts directly to an enlarged air-flow passageway 44 formed at right angles therewith.

The air-flow passageway 44 has first and second valve seats 45 and 46 facing in opposing directions for being cooperable with an interconnected bi-valve assembly.

This bi-valve assembly comprises two valve members 47 and 48 which have valve heads 49 and 50 cooperable with the valve seats 45 and 46 for controlling the degree of vacuum to the vacuum chambers 16 and 17 within the actuator section. The valve heads 49 and 50 are biased into a closing relationship with the respective valve seats 45 and 46 by an interconnecting spring 51. The spring 51 is disposed within the air-flow passageway 44 and is hooked at eye openings 52 and 53 formed within connector stems 54 and 55 respectively. The connector stems 54 and 55 are provided to be integral with the valve heads 49 and 50 and have a sufficiently reduced diameter for being received loosely within the air-flow passageway 44.

Because the air-flow passageway 44 conducts directly from the vacuum supply through the needle passageway 43 to the interior of the semi-casings 36 and 37, pressure seals 56 and 57 are fitted between the outer surface of the annular disk 39 and shoulders 58 and 59 respectively. With the disk 39 positioned and sealed by the members 58 and 59, annular valve chambers 60 and 61 are defined at the interior of the semi-casings 36 and 37.

The outer walls 62 and 63 of the chambers 60 and 61 have a second pair of valve seats 64 and 65 formed about vent passageways 66 and 67 which extend substantially axially of the air-flow passageway 44.

To control the flow of air through the vent passageways 66 and 67, the valve members 47 and 48 have a second set of valve heads 68 and 69 formed oppositely of the similar heads 49 and 50. Also, the heads 68 and 69 are provided with armatures 70 and 71 which are received loosely within the vent passageways 66 and 67. To maintain the alignment of the indicated valve heads with the cooperable seats the valve members 47 and 48 have guide disks 72 and 73 extending radially within the annular valve chambers 60 and 61. Therefore, regardless of the orientation of the valve assembly, the guide disks will provide the necessary orientation to assure proper seating of the valves.

Actuation of the valve members 47 and 48 is accomplished through miniature solenoid windings 74 and 75 which are fitted about the vent passageways 66 and 67 for inducing movement of the armatures 70 and 71. The solenoids 74 and 75 are positioned by caps 76 and 77 which are snap-fitted about the exterior of the vent passageways 66 and 67 and locked in place at overlying ridges 78 and 79.

From a consideration of the valve orientation, it is to be understood that the annular valve chambers 60 and 61 will be evacuated or maintained at atmospheric pressure depending upon the axial position of the valve members 47 and 48. With the solenoids 74 and 75 de-energized, the valve members 47 and 48 will be tensioned into the position shown in FIGURE 1 by the interconnecting spring 51. Under this orientation, the valve chambers will be at atmospheric pressure due to the presence of the opened vent passageways 66 and 67.

Upon actuation of the respective solenoids, the armatures 70 and 71 will be forced outwardly within the vent passageways, and the valve heads 68 and 69 will be repositioned within the cooperable valve seats 64 and 65. Therefore, during energization of the associated solenoids the vacuum source of the engine manifold will be connected directly through the needle passageway 43 and the air-flow passageway 44 to the annular valve chambers 60 and 61.

However, the annular chambers 60 and 61 are directly communicable with the actuator vacuum chambers 16 and 17 by the connecting passageways 80 and 81. Therefore, actuation of the bi-valve assembly directly controls the degree of vacuum delivered to the vacuum chambers 16 and 17.

In particular, actuation of the solenoid 74 will substantially simultaneously close the vent passageway 66 and open the air-flow passageway 44 at the valve seat 45. At this point, the vacuum source of the intake manifold will be directly communicable with the vacuum chamber 16. Because only the solenoid 74 has been energized, the valve member 48 will retain its biased position at the valve seat 46, and consequently the vacuum chamber 17 will be maintained at atmospheric pressure.

The effect of this single solenoid energization will be a net pressure differential across the power diaphragm 25. In response, the diaphragm 25 will move for reducing the volume of the vacuum chamber 16 and increasing the volume of the vacuum chamber 17. The resulting translation of the power actuator 30 may provide the necessary mechanical control motion, for instance, for regulating the air-flow temperature to an automobile compartment.

Similarly, by energizing the solenoid 75, the valve member 48 will be forced into position for closing the vent passageway 67 and opening the air-flow passageway 44. This will provide a direct connection from the intake manifold to the vacuum chamber 17. As the solenoid 74 is not energized in this example, the vacuum chamber 16 will be maintained at atmospheric pressure for developing the necessary pressure differential across the power diaphragm 25.

Contrary to the previous example, the energization of the solenoid 75 will cause the power diaphragm 25 to move for increasing the volume of the vacuum chamber 16 and correspondingly decreasing the volume of the vacuum chamber 17. The resulting translation of the actuator 30 will then be directly opposing to that experienced by the energization of the solenoid 74. Therefore, a bi-directional translation results from the discriminate energizing of the respective solenoid coils. This bi-directional motion of the actuator 30 is ideal for performing an opening and closing function as is required to control the air flow to passenger areas of an automobile.

In the environmental structure, as shown in FIGURE 1, the bi-directional translation of the power actuator 30 is used to operate a blend air door for controlling the ratio of hot or cool air reaching the passenger compartments.

In particular, the blend air door 82 is pivoted about a point 83 and is actuated by the shaft 30 which is suitably connected to the rear portions thereof as at 84. The bi-directional motion of the shaft 30 will cause the door 82 to assume all positions indicated by the arrow 85 between the limits shown at 86 and 87. When the door 82 is moved counterclockwise to the position at 86, the cool air vent will be completely closed, and the heater duct will be fully opened. This position will correspond to maximum heat flow to the interior of the vehicle. Contrariwise, as the door 82 moves to assume the extreme clockwise position as at 87, the heater duct will be completely closed and the cool air movement will be maximized. All settings of the blend air door 82 intermediate these extremes will result in a fixed combination of warm and cool air for satisfying a given heat supply or heat dissipation characteristic of the vehicle.

As the power member 30 is moved in one of the two illustrated directions due to the opening of the associated valve head, the blend air door will be carried as described. However, after the vacuum supply which had initiated the original movement has been vented to the atmosphere, the blend air door 82 will retain its established position. This occurs through the friction offered by the moving members. Therefore, the power diaphragm 25 will be maintained in a substantially equilibrium position regardless of the relative volumes of the vacuum chambers 16 and 17.

It will be understood that various modifications may be suggested by the embodiment disclosed, but I desire to claim within the scope of the patent warranted hereon all such modifications as come within the scope of my invention.

I claim as my invention:

1. A tri-position vacuum valve actuator comprising:
a valve actuator housing having a valve section and an actuator section thereof,
said valve section having first and second annular valve chambers formed therein,
an air-flow passageway connecting said first and second annular valve chambers,
an inlet formed within said valve section for conducting from a vacuum source to said air-flow passageway,
a first and second valve seat formed at said air-flow passageway adjacent to said annular valve chambers and a first and second valve head cooperable with said respective valve seats for controlling the degree of vacuum delivered therethrough,
said first and second valve heads having annular disks extending radially therefrom for being loosely slidably received within said annular chambers,
said annular disks guiding said valve heads within said annular chambers,
vent passageways conducting from said annular chambers axially of said air-flow passageway to the atmosphere,
said valve heads having a valve stem formed centrally of said annular disks and extending within said vent passageway,
electric solenoids disposed about said vent passageways for actuating said valve heads,
said valve stem providing a movable armature for being actuated by said electric solenoids,
a resilient member disposed within said air-flow passageway and connecting said first and second valve heads therethrough,
said resilient member continuously biasing said first and second valve heads into engagement with said respective valve seats,
independent means for actuating each of said electric solenoids,
a first and second actuator passageway conducting from said first and second valve chambers respectively to said actuator section,
said actuator section having a first and second vacuum chamber formed therein,
a power diaphragm providing a common wall intermediate said first and second chambers,
said first actuator passageway conducting to said first vacuum chamber,
said second actuator passageway conducting to said second vacuum chamber,
means venting said vacuum chambers to the atmosphere upon deactuation of said valve heads,
a power member connected to said power diaphragm and extending through a wall of said actuator housing for performing a control function,
said power diaphragm actuated by vacuum delivered to one of said vacuum chambers,
said power diaphragm retaining its actuated position upon the removal of the actuating source.

2. A tri-position vacuum valve actuator comprising:
a valve actuator housing having a valve section and and an actuator section thereof,
said valve section having first and second valve chambers formed therein,
an air-flow passageway connecting said first and second valve chambers,
an inlet formed within said valve section for conducting from a pressure differential source to said air-flow passageway,
first and second valve seats formed at said air-flow passageway adjacent to said valve chambers and first and second valve heads cooperable with said respective valve seats for controlling the flow of air therethrough,
said first and second valve heads having annular disks extending radially therefrom for being loosely slidably received within said valve chambers,
said annular disks guiding said valve heads within said valve chambers,
vent passageways conducting from said valve chambers axially of said air-flow passageway to the atmosphere,
said valve heads having a valve stem formed centrally of said annular disks and extending within said vent passageway,
energizing means disposed about said vent passageways for actuating said valve heads,
a resilient member disposed within said air-flow passageway and interconnecting said first and second valve heads therethrough,
said resilient member continuously biasing said first and second valve heads into engagement with said respective valve seats,
first and second actuator passageways conducting from said first and second valve chambers respectively to said actuator section,
said actuator section having first and second actuator chambers formed therein,
a power diaphragm providing a common wall intermediate said first and second actuator chambers,
said first actuator passageway conducting to said first actuator chamber,
said second actuator passageway conducting to said second actuator chamber,
means venting said actuator chambers to the atmosphere upon deactuation of said valve heads,
a power member connected to said power diaphragm and extending through a wall of said actuator housing for performing a control function.

3. A tri-position vacuum valve actuator comprising:
a valve actuator having a valve section and an actuator section,
said valve section having first and second valve chambers formed therein and having an air-flow passageway interconnecting said first and second valve chambers and having first and second valve seats formed at the junction of said air-flow passageway with said first and second valve chambers, respectively,
said valve section having an inlet communicating from outside said valve section to said air-flow passageway,
said actuator section having first and second actuator chambers formed therein and a power diaphragm providing a common wall intermediate said first and second actuator chambers,
said first and second valve chambers being communicable with said first and second actuator chambers, respectively,
first and second valve means operably disposed in said first and second valve chambers, respectively, for opening and closing the communication of said air-flow passageway to said associated valve chambers,
resilient means disposed within said air-flow passageway and interconnecting said first and second valve means and urging the same into closed positions at said first and second valve seats, respectively,
means for selectively venting said valve chambers to the atmosphere,
means for energizing said first and second valve means independently into opened positions, and
means for applying a fluid having a pressure differential relative to atmosphere to said inlet,
whereby the selective opening of said air-flow passageway to one of said valve chambers develops a pressure differential across said power diaphragm for moving the same within said actuator section.

4. A tri-position vacuum valve in accordance with claim 3 wherein said first and second valve means have annular disks extending radially therefrom for being loosely slidably received within said annular chambers, said annular disks guiding said valve heads within said valve chambers, a vent passageway conducting from each of said valve chambers substantially axially of said air-flow passageway to the atmosphere,
each of said annular disks having a valve stem formed centrally thereof and extending within said respective vent passageway,
separate means operably associated with each of said valve stems for urging said associated valve means away from a closed position at said air-flow passageway and toward a closed position at said associated vent passageway.

5. A tri-position vacuum valve in accordance with claim 4 wherein said means for energizing said first and second valve means comprising a pair of electric solenoids, one of which is disposed about each of said vent passageways, said valve stem acting as an armature to move the valve means away from a closed position at the air-flow passageway and toward a closed position at the vent passageway upon energization of said associated solenoid.

References Cited

UNITED STATES PATENTS

| | | | |
|---|---|---|---|
| 776,783 | 12/1904 | Hunter | 251 |
| 817,366 | 4/1906 | Frank et al. | 91—465 X |
| 1,382,935 | 6/1921 | Schairer et al. | 91—465 X |
| 2,886,011 | 5/1959 | Radford | 92—100 X |
| 3,207,468 | 9/1965 | Lauducci et al. | 251—30 X |

M. CARY NELSON, *Primary Examiner.*

W. JOHNSON, A. ROSENTHAL, *Assistant Examiners.*